US009251072B2

(12) United States Patent
Solihin

(10) Patent No.: US 9,251,072 B2
(45) Date of Patent: *Feb. 2, 2016

(54) CACHE COHERENCE DIRECTORY IN MULTI-PROCESSOR ARCHITECTURES

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,452

(22) Filed: Apr. 15, 2015

(65) Prior Publication Data

US 2015/0220437 A1    Aug. 6, 2015

Related U.S. Application Data

(63) Continuation of application No. 13/877,422, filed as application No. PCT/US2012/055502 on Sep. 14, 2012, now Pat. No. 9,053,057.

(51) Int. Cl.
*G06F 12/08* (2006.01)
*G06F 12/12* (2006.01)

(52) U.S. Cl.
CPC .......... *G06F 12/0817* (2013.01); *G06F 12/082* (2013.01); *G06F 12/122* (2013.01); *G06F 12/123* (2013.01); *G06F 2212/1008* (2013.01); *G06F 2212/283* (2013.01); *G06F 2212/621* (2013.01); *Y02B 60/1225* (2013.01)

(58) Field of Classification Search
CPC . G06F 12/0817; G06F 12/082; G06F 12/122; G06F 12/123

USPC ......... 711/118, 119, 133, 135, 144, 154, 156, 711/205, 207, 221

See application file for complete search history.

(56) References Cited

U.S. PATENT DOCUMENTS 4,322,795 A    3/1982    Lange et al.
4,885,680 A   12/1989    Anthony et al.
5,940,877 A *  8/1999    Eickemeyer et al. ......... 711/220

(Continued)

OTHER PUBLICATIONS

Lee, H., "Fault-and Yield-Aware On-Chip Memory Design and Management," Ph.D. dissertation, University of Pittsburgh, pp. 1-112, (Apr. 13, 2011).

(Continued)

*Primary Examiner* — Stephen Elmore
(74) *Attorney, Agent, or Firm* — Moritt Hock & Hamroff LLP; Steven S. Rubin, Esq.

(57) ABSTRACT

Technologies are generally described for a cache coherence directory in multi-processor architectures. In an example, a directory in a die may receive a request for a particular block. The directory may determine a block aging threshold relating to a likelihood that data blocks, including the particular data block, are stored in one or more caches in the die. The directory may further analyze a memory to identify a particular cache indicated as storing the particular data block and identify a number of cache misses for the particular cache. The directory may identify a time when an event occurred for the particular data block and determine whether to send the request for the particular data block to the particular cache based on the aging threshold, the time of the event, and the number of cache misses.

23 Claims, 5 Drawing Sheets

(56) References Cited

U.S. PATENT DOCUMENTS

| | | | |
|---|---|---|---|
| 6,263,404 B1* | 7/2001 | Borkenhagen et al. | 711/137 |
| 6,421,766 B1 | 7/2002 | Jones, Jr. | |
| 6,691,297 B1 | 2/2004 | Misaka et al. | |
| 6,704,843 B1 | 3/2004 | Arimilli et al. | |
| 6,920,532 B2 | 7/2005 | Glasco et al. | |
| 6,996,676 B2 | 2/2006 | Megiddo et al. | |
| 7,334,089 B2 | 2/2008 | Glasco | |
| 7,953,932 B2 | 5/2011 | Shum et al. | |
| 8,341,358 B1 | 12/2012 | Edmondson et al. | |
| 8,407,421 B2 | 3/2013 | Steely, Jr. et al. | |
| 8,463,825 B1 | 6/2013 | Harty | |
| 2005/0251626 A1 | 11/2005 | Glasco | |
| 2007/0180196 A1 | 8/2007 | Guthrie et al. | |
| 2008/0104331 A1 | 5/2008 | Handgen | |
| 2008/0235456 A1 | 9/2008 | Kornegay et al. | |
| 2009/0216947 A1 | 8/2009 | Bohn et al. | |
| 2009/0300288 A1 | 12/2009 | Lefebvre et al. | |
| 2010/0268912 A1 | 10/2010 | Conte | |
| 2010/0318527 A1 | 12/2010 | Nandy et al. | |
| 2011/0153946 A1* | 6/2011 | Solihin | 711/124 |
| 2011/0276762 A1 | 11/2011 | Daly et al. | |
| 2011/0320558 A1 | 12/2011 | Gross et al. | |
| 2012/0137059 A1 | 5/2012 | Yang et al. | |
| 2012/0137061 A1 | 5/2012 | Yang et al. | |
| 2012/0144098 A1 | 6/2012 | Yang et al. | |
| 2014/0040676 A1* | 2/2014 | Solihin | 714/54 |
| 2014/0223104 A1* | 8/2014 | Solihin | 711/135 |

OTHER PUBLICATIONS

Bardisa, A.R., "Efficient and Scalable Cache Coherence for Many-Core Chip Multiprocessors," Universidad De Murcia, Jul. 2009, pp. 1-239.

Borkar, S., and Chien, A.A., "The Future of Microprocessors," Communications of the ACM, vol. 54, No. 5, pp. 67-77 (2011).

Chaudhuri, M., "PageNUCA: Selected Policies for Page-grain Locality Management in Large Shared Chip-multiprocessor Caches," IEEE 15th International Symposium on High Performance Computer Architecture, pp. 227-238, (Feb. 14-18, 2009).

Conway, P., et al., "Cache Hierarchy and Memory Subsystem of the AMD Opteron Processor," IEEE Micro, vol. 30, No. 2, pp. 16-29 (Mar.-Apr. 2010).

International Search Report and Written Opinion for application with application No. PCT/US12/55502, dated Jan. 25, 2013, pp. 8.

International Search Report and Written Opinion for related PCT Application No. PCT/US2013/025522 mailed Apr. 23, 2013, pp. 8.

* cited by examiner

300 A computer program product.

302 A signal bearing medium.

304

At least one of
One or more instructions for a method for processing a request in a die in a multi-processor architecture; or
One or more instructions for receiving a request, by a directory, for a particular data block; or
One or more instructions for determining, by the directory, an aging threshold relating to a likelihood that data blocks, including the particular data block, are stored in one or more caches in the die; or
One or more instructions for analyzing, by the directory, a memory to identify a particular cache indicated as storing the particular data block; or
One or more instructions for analyzing, by the directory, the memory to identify a number of cache misses for the particular cache; or
One or more instructions for analyzing, by the directory, the memory to identify a time when an event occurred for the particular data block; or
One or more instructions for determining, by the directory, whether to send the request for the particular data block to the particular cache based on the aging threshold, the time of the event, and the number of cache misses.

| 306 A computer readable medium | 308 A recordable medium | 310 A communications medium |

Fig. 4

CACHE COHERENCE DIRECTORY IN MULTI-PROCESSOR ARCHITECTURES

CROSS REFERENCE TO RELATED APPLICATIONS

This Application is a continuation pursuant to 35 U.S.C. 120 of U.S. application Ser. No. 13/877,422 filed on Apr. 2, 2013, now U.S. Pat. No. 9,053,057. U.S. application Ser. No. 13/877,422 is a U.S. National Stage Application pursuant to 35 U.S.C. §371 of International Application No. PCT/US12/55502, filed on Sep. 14, 2012. The disclosures of these applications are hereby incorporated herein by reference in their entirety.

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die. Each processor may be provided with a cache that stores data for the processor. As a single piece of data may be stored in multiple caches, a cache coherence protocol may be configured to keep track of the data stored in multiple caches. The cache coherence protocol may be configured to help ensure that multiple requests for data consistently result in the same data being returned.

SUMMARY

In some examples, a method for processing a request in a die in a multi-processor architecture is generally described. The method may include receiving a request for a particular data block. The method may further include determining an aging threshold relating to a likelihood that data blocks, including the particular data block, are stored in one or more caches in the die. The method may further include analyzing a memory to identify a particular cache indicated as storing the particular data block. The method may further include analyzing the memory to identify a number of cache misses for the particular cache. The method may further include analyzing the memory to identify a time when an event occurred for the particular data block. The method may further include determining whether to send the request for the particular data block to the particular cache based on the aging threshold, the time of the event, and the number of cache misses.

In some examples, a directory in a multi-processor architecture is generally described. The directory may include a memory and a directory controller configured to be in communication with the memory. The directory controller may be effective to receive a request for a particular data block. The directory controller may be effective to determine an aging threshold relating to a likelihood that data blocks, including the particular data block, are stored in one or more caches in the die. The directory controller may be further effective to analyze the memory to identify a particular cache indicated as storing the particular data block. The directory controller may be effective to analyze the memory to identify a number of cache misses between a first time and a second time for the particular cache. The directory controller may be effective to analyze the memory to identify a time when an event occurred for the particular data block. The directory controller may further be effective to determine whether to send the request for the particular data block to the particular cache based on the aging threshold, the time of the event, and the number of cache misses.

In some examples, a die in a multi-processor architecture is generally described. The die may include a first tile, a second tile and a directory. The first tile may include first cache and a first processor. The second tile may include a second cache and a second processor. A directory may be configured to be in communication with the first and the second tile. The directory may include a memory and a directory controller. The directory controller may be effective to receive a request for a particular data block. The directory controller may be effective to determine an aging threshold relating to a likelihood that data blocks, including the particular data block, are stored in one or more caches in the die. The directory controller may further be effective to analyze the memory to identify a particular cache indicated as storing the particular data block. The directory controller may be effective to analyze the memory to identify a number of cache misses between a first time and a second time for the particular cache. The directory controller may be effective to analyze the memory to identify a time when an event occurred for the particular data block. The directory controller may be effective to determine whether to send the request for the particular data block to the particular cache based on the aging threshold, the time of the event, and the number of cache misses.

The foregoing summary is illustrative only and is not intended to be in any way limiting. In addition to the illustrative aspects, embodiments, examples, and features described above, further aspects, embodiments, examples, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the following accompanying drawings:

FIG. 4 illustrates a computer program product that can be utilized to implement a cache coherence directory in a multi-processor architecture.

DETAILED DESCRIPTION

Figure 1:
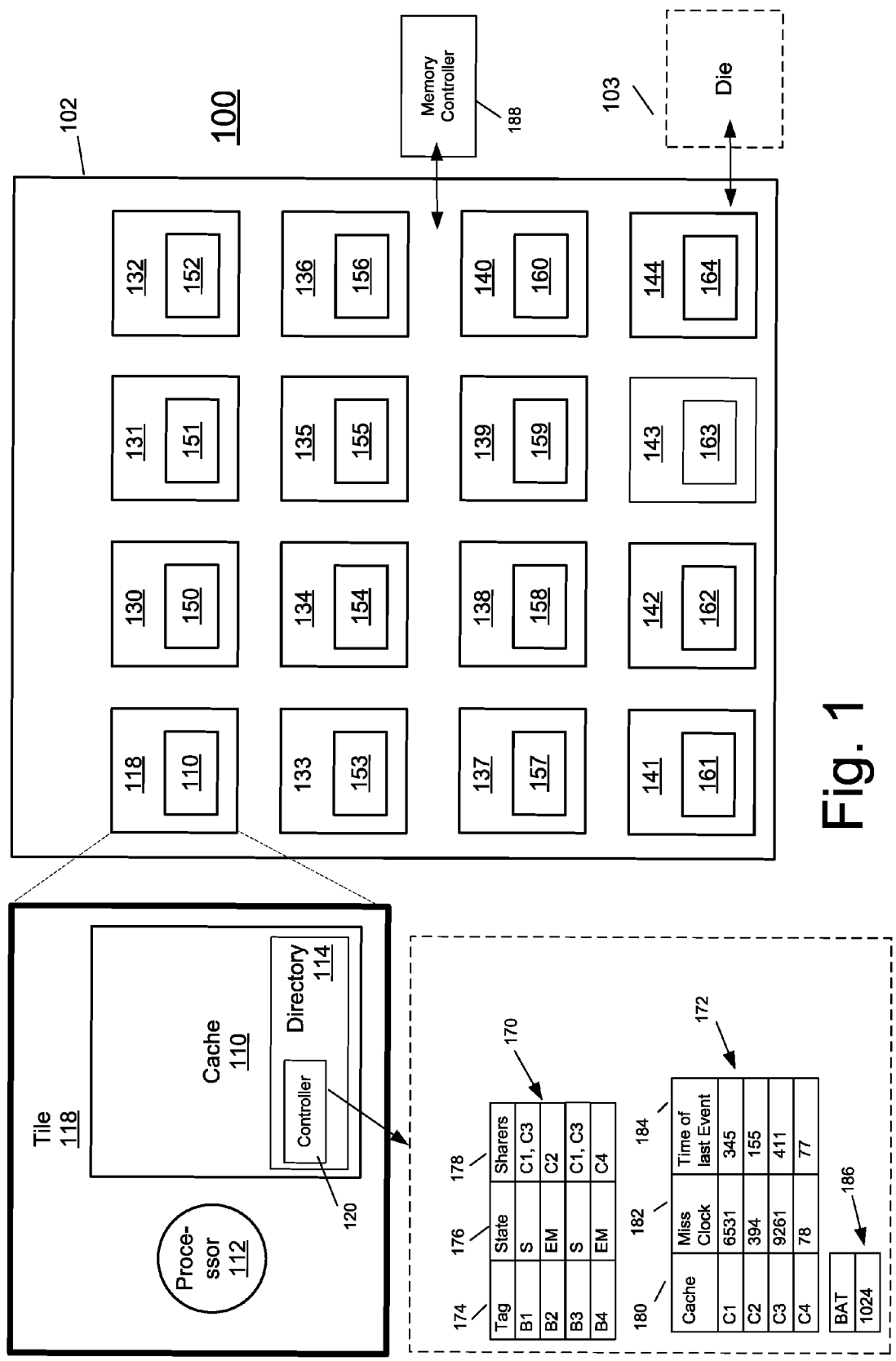
FIG. 1 illustrates an example system that can be utilized to implement a cache coherence directory in a multi-processor architecture.

In the present detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to a cache coherence directory in multi-processor architectures.

Briefly stated, technologies are generally described for a cache coherence directory in multi-processor architectures. In an example, a directory in a die may receive a request for a particular block. The directory may determine a block aging threshold relating to a likelihood that data blocks, including the particular data block, are stored in one or more caches in the die. The directory may further analyze a memory to identify a particular cache indicated as storing the particular data block and identify a number of cache misses for the particular cache. The directory may identify a time when an event occurred for the particular data block and determine whether to send the request for the particular data block to the particular cache based on the aging threshold, the time of the event, and the number of cache misses.

FIG. 1 illustrates an example system that can be utilized to implement a cache coherence directory in multi-processor architectures arranged in accordance with at least some embodiments described herein. An example system 100 may include a die 102 including a plurality of tiles. Focusing on tile 118 for illustration, the tile 118 may include a cache 110, a processor or processor core (hereinafter referred to as "processor") 112, and/or a directory 114. Processor 112 may be adapted to process data including code (hereinafter both data and code referred to as "data block"). Cache 110 may be configured to store a data block local to processor 112. Directory 114 may include a directory controller 120. Directory controller 120 may be used to control operations of directory 114 as explained herein.

As described in more detail below, directory controller 120 may be configured to generate and/or store data effective to keep track of how long data has been stored in respective caches. Based on a number of cache misses, and other heuristics described herein, directory controller 120 may be effective to determine a likelihood analysis. The likelihood analysis may indicate the likelihood that cache coherence data in the directory may be stale and that a block is likely still stored or likely no longer stored in a cache identified by the directory. The directory controller may perform this likelihood analysis before requests for blocks are sent to caches. Acting on the analysis may thereby avoid wasted latency in situations where the block is no longer stored in the cache. In examples where the directory controller determines that the cache data for a particular block is stale, the directory controller may send a request for the particular block off of the die to fetch the particular block from a main memory. Space in a directory may be created and items evicted based on the likelihood analysis and determinations of staleness.

Die 102 may include a matrix (e.g., array) of tiles 118, 130-144 including respective caches 110, 150-164. Each tile may also include one or more of a respective processor 112 and/or a directory 114. Each tile in die 102 may be substantially the same as in a homogenous arrangement, or some tiles may be different as in a heterogeneous arrangement. Die 102 may be arranged in communication with another die 103 so that data may be shared among a plurality of dies.

Directory 114 may include a memory that identifies (e.g., indexes) a location associated with each data block that is stored in the tiles of die 102. Directory 114 may be located in a single tile on die 102 or distributed among many or all tiles. If directory 114 is distributed, for example, a first range of addresses (such as 0x0000-0x1000) may be stored in a first tile, a second range of addresses (such as 0x1001-0x2000) stored in a second tile, etc. Directory 114 in the figure thus may illustrate a first portion of an entire die directory where that first portion may be stored in tile 118 and additional portions may be stored in other tiles such as tiles 130, 131, 132, etc.

Directory 114 may include a list of blocks stored in die 102, along with a state of the block and which caches may be sharing the block. For example, directory 114 may use a MESI, MOESI, MSI, MOSI etc. protocols. In these type of protocols, directory 114 may keep track of sharing states such as: modified (M) such as when a cache line has been modified since the line has been moved from a main memory; exclusive (E) such as when a cache line is only in one cache but the line matches a main memory; exclusive-modified (EM) such as when as cache line is modified and exclusive to a cache; shared (S) such as when the cache line may be stored in other caches and the line matches the main memory; invalid (I) such as when the cache line is invalid; and/or owned (O) such as when the indicated cache line includes the most recent copy of the data.

Directory 114 may be configured to store coherence data relating to caches. Directory 114 may store a coherence table 170 and a second table 172 relating to data stored in caches in die 102. Table 170 may include data in fields such as tag 174, state 176 and/or sharers 178. Tag field 174 may indicate blocks of data such as, in an example, blocks "B1", "B2", "B3", and/or "B4". State field 176 may indicate a coherence state of these blocks using one of the above mentioned protocols. Field 178 may indicate which caches, if any, are sharing the block. In the example shown, block B1 is stored in a shared "S" state and is shared by caches C1 and C3; block B2 is in an exclusive-modified state and is shared by cache C2 only; block B3 is stored in a shared state and is shared by caches C1 and C3; block B4, is in an exclusive modified state and is shared by cache C4 only.

Second table 172 may include data in fields such as "Cache" 180, "Miss Clock" 182 and/or "Time of last event" 184. Cache field 180 may store data identifying caches in die 102. Miss clock field 182 may indicate a number of cache misses. Time of last event field 184 may indicate the last time an event occurred in the respective cache such as a cache miss or a request to upgrade a coherence state. A request to upgrade a coherence state may occur with a request to write to the block. The time of last event field 184 may keep track of the last time a block was known by directory 114 to have been accessed by a processor. The time of last event field may keep track of time using the miss clock as a counter as is explained below.

Directory controller 120 may calculate a block aging threshold 186 that may be used to determine whether data relating to a block's coherence state has become stale. Block aging threshold 186 may be based on the likelihood that a block has been removed from a cache and/or the likelihood that cache coherence data has become stale. In an example, block aging threshold 186 may be calculated based on the number of misses that have occurred to other blocks in die 102 and may be used to determine a likelihood that the coherence state of a particular block has become stale. The block aging threshold may be calculated based on a desired degree of confidence that a block indicated as being stored in a cache is still stored in the cache. The block aging threshold may be calculated by directory controller 120 using data gathered when dirty blocks, such as those that have been written to since being accessed from a main memory, are evicted from a cache. The block aging threshold may also be calculated by directory controller 120 using data gathered from clean blocks, exclusive to one cache, that have been evicted by their respective caches.

In an example, block aging threshold 186 may be computed in the following manner:

Assume for each block $B_n$ in a cache C, the number of misses that have occurred to other blocks in cache C until block $B_n$ is evicted from cache C is $x_n$. An average of x $avgx=(x_1+x_2+ \ldots +x_n)/n$. A standard deviation of x $stdevx=sqrt(((x_1-avgx)^2+(x_2-avgx)^2+ \ldots (x_n-avgx)^2)/n)$, where sqrt is a square root operation. The block aging threshold may be avgx+stdevx which may in an example achieve an 84% confidence regarding a likelihood whether a block has been evicted from a cache. In another example, a block aging threshold may be avgx+2*stdevx and may achieve a 99.5% confidence regarding a likelihood whether a block has been evicted from a cache.

As tile 118 operates, data may be requested by caches in processor cores. The cores may be informed of a cache miss indicating that the requested blocks are not stored in the respective caches. Directory controller 120 may keep track of a number of cache misses for respective caches and update miss clock field 182 based on these cache misses. A large miss clock, such as a 64 bit miss clock, may be used to avoid overflow. As mentioned above, the time of last event field 184 may indicate the last time, based on the miss clock, a block was known by the directory to have been accessed by a processor. This may be the last time the directory had accurate coherence data. Based on the block aging threshold, the miss clock and the time of the last event, the directory controller may determine a staleness of the coherence data.

In an example illustrated in FIG. 1, block B1 is shared by caches C1 and C3. A time of the last event 184 for cache C1 is 345 (referenced to the miss clock) and, in the example, the block aging threshold (BAT) was calculated to be 1024. As the time of last event is less than the miss clock minus the block aging threshold (345<6531−1024), directory controller 120 may determine that block B1 in cache C1 has aged and therefore coherence data may be stale. Similarly, the time of the last event for cache C3 is 411 and less than the miss clock for C3 minus the block aging threshold (411<9261−1024), so directory controller 120 may determine that block B1 at cache C3 has also aged. These determinations regarding block B1 in caches C1 and C3 indicate that block B1 is unlikely to still be stored in caches C1 and C3. Consequently, directory controller 120 may forward requests for block B1, not to caches C1 or C3, but off of die 102 such as to a memory controller 188.

Focusing on block B2, block B2 is likely still stored in cache C2 because the time of last event is greater than the miss clock for C2 minus the block aging threshold (155>394−1024). Block B3 may provide a mixed likelihood as block B3 has likely aged in cache C1 but not in cache C3. In the example, block B4 was just recently stored in the cache as the time of the last event was 77 and the miss clock count is 78 and so block B4 is likely still stored in cache C4.

The time of last event data may be maintained by directory controller 120 in a variety of ways. For example, the time of last event data may keep track of each missed clock tick. In another example, the time of last event data may keep track of a larger number of miss clock ticks such as every $2^x$ (2 to the power x) miss clock ticks to reduce a size of the time of last event data stored in directory 114.

Time of last event data may be maintained for each block. Time of last event data may be maintained for groups or pages of blocks such as 4 KB consecutive blocks which may form a page in a memory. Blocks in a page likely have similar levels and likelihoods of staleness or aging as these blocks are likely accessed together due to spatial locality. Cache misses or invalidation requests, as may be events that would cause the directory controller to update the time of last event data, may be maintained for an entire page. The time of last event data may be updated as events occur for blocks on the page. In an example where a block size is 64 bytes, this approach of keeping track of time of last event data for a page may reduce a memory usage for the time of last event data by 4 KB/64=64.

Time of last event data may be maintained for each cache. In an example, time of last event data may be maintained for a few representative caches used to represent multiple caches. A cache miss from any of the represented caches may update the time of last event data. A combination or sub-combination of time of last event data storage techniques may be used. For example, some or all of keeping track of multiple ($2^x$) cache misses, maintaining data for pages of blocks, and/or maintaining data for representative caches may be used by directory controller 120.

Figure 2:
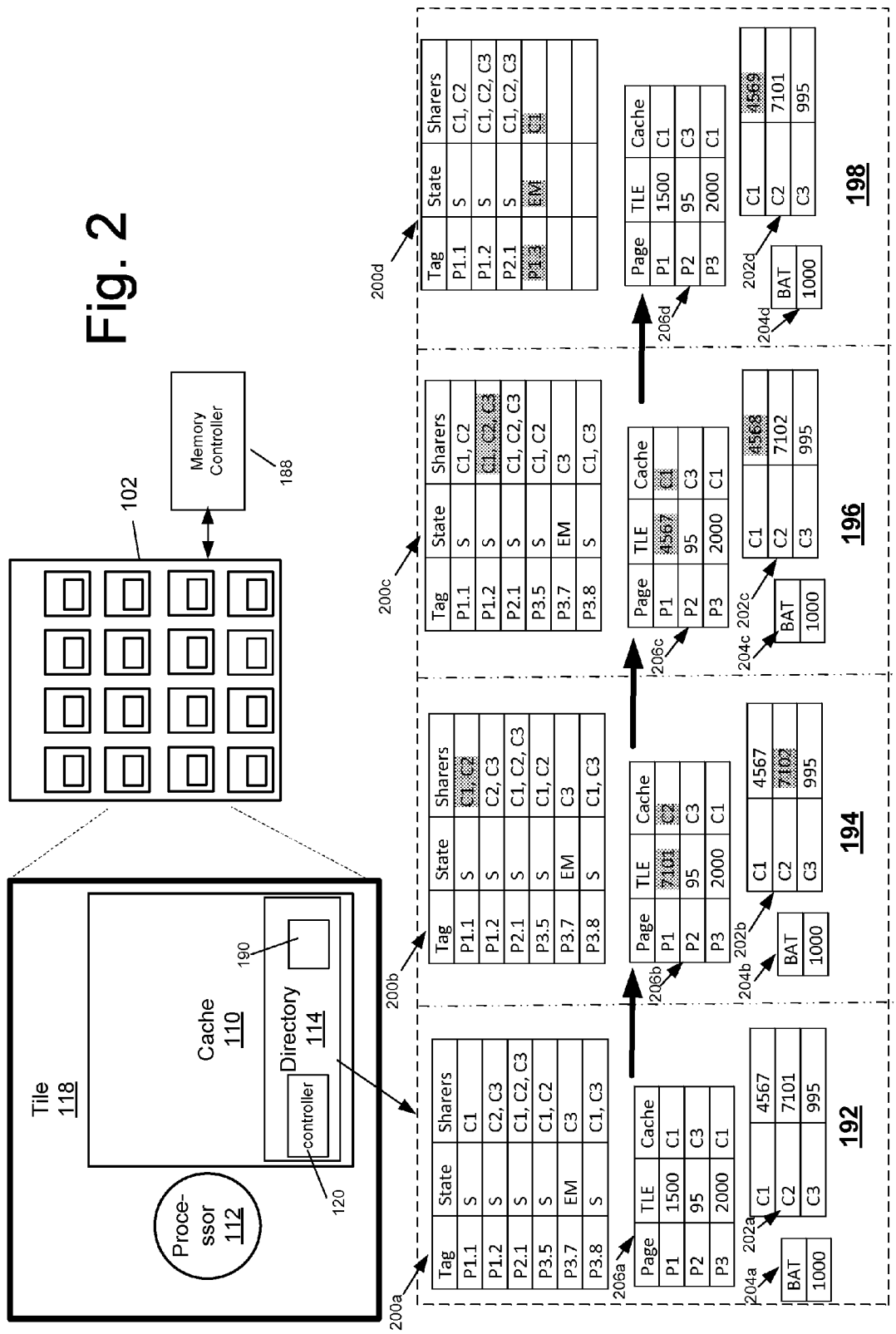
FIG. 2 illustrates the example system that can be utilized to implement a cache coherence directory in a multi-processor architecture of FIG. 1 including further detail of example directories.

FIG. 2 illustrates the example system that can be utilized to implement a cache coherence directory in multi-processor architectures of FIG. 1 including further detail of example directories arranged in accordance with at least some embodiments described herein. FIG. 2 is similar to system 100, with additional details. Those components in FIG. 2 that are labeled identically to components of FIG. 1 will not be described again for the purposes of clarity.

Directory 114 may further include a victim selection and confirmation logic 190 that may be used to evict an entry in a memory of directory 114 based on a likelihood of the staleness of the entry as discussed herein. FIG. 2 illustrates an example of implementing system 100. In the example, coherence tables 200a, 200b, 200c, and 200d, miss clock tables 202a, 202b, 202c, and 202d, block aging thresholds 204a, 204b, 204c, and 204d and time of last event tables 206a, 206b, 206c, and 206d are each shown for four different times 192, 194, 196, 198 and indicated by letters a, b, c and d. Focusing on time 192, in an example, a processor corresponding to cache C2 may experience a cache miss when requesting block P1.1. Block Px.y indicates the $y^{th}$ block on page x. According to the cache coherence table 200a directory, cache C1 is storing block P1.1 in a shared "S" state. The time of last event table 206a indicates that the last time block P1.1 was accessed was at C1s cache miss clock time of 1500. The miss clock 202a for C1 indicates a current miss time of 4567. Because the miss clock minus the time of last event is greater than the block aging threshold (4567−500>1000), directory controller 120 may determine that block P1.1 is stale and likely no longer cached in C1. Directory controller 120 may therefore send the request for block P1.1 to memory controller 188 instead of to cache C1. Latency is saved by not first sending a request to cache C1 to see if cache C1 has block P1.1 because it is likely that block P1.1 is no longer stored in cache C1.

In the example, a directory entry exists for P1.1 and so a decision regarding eviction (to make room for P1.1) in directory 114 need not necessarily be made. Time of last event table 206 may be updated by using the miss clock entry for cache C2—the cache relating the processor requesting block P1.1. In the example, miss clock 202a for C2 was 7101 and so time of last event table 206b is updated, as shown at 194, indicating that the last event for Page P1 (including block P1.1) was by cache C2 at time 7101. In this example, the time of last event data may be maintained based on changes to blocks in a page (block P1.1 is in page P1). Miss clock 202 is incremented to 7102 as shown at miss clock 202b.

Focusing on 194, in another example, a processor corresponding to cache C1 may experience a cache miss in requesting block P1.2 and may send a request to directory controller 120 for block P1.2. Directory controller 120 may analyze cache coherence table 200b and determine that block P1.2 is stored in a shared state S shared by caches C2 and C3. The time of last event table 206b indicates that the time of the last event for page P1 was 7101 and was accessed by cache C2. Because the miss clock time for C2 minus the time of the last event is less than the block aging threshold (7102−7101<1000), the block is likely fresh and still stored in the indicated cache. Therefore, directory controller 120 may send the request for block P1.2 to either cache C2 or C3. Latency is saved because off-chip memory need not be accessed.

Now block P1.2 is shared by caches C1, C2, and C3 as indicated by coherence table 200c. Miss clock table 206 may be updated to indicate that the number of misses for clock C1 is now 4568 as shown in miss clock 202c. The time of last event table may be updated to indicate that the last event for page P1 is now 4567 and the event is from cache C1.

In another example, focusing on time 196, a processor corresponding to C1 may experience a cache miss when requesting access to block P1.3. A processor corresponding to C1 may send a request to directory controller 120 for block P1.3 and directory controller 120 may determine that there is no data for block P1.3 in the directory and so an entry should be made and an entry should be selected for eviction. In the example, block P1.3 maps to a space corresponding to either block P2.1 or block P3.5 and a decision should be made to evict one of these blocks.

Directory controller 120 may analyze data relating to block P2.1 and block P3.5 and determine respective likelihoods that these blocks are still stored in the indicated caches. For example, directory controller 120 may determine that P2.1 has not aged (995−95<1000) and that block P3.5 has aged 4568−2000>1000. As block P3.5 has aged, it is likely that blocks in page P3 are no longer cached and so victim selection and confirmation logic 190 may evict block P3.5 by sending an invalidation message to caches that are storing block P3.5. In the example, caches C1 and C2 may receive an invalidation message. In another example, directory controller 120 may send a message to all caches storing data for page P3 due to all blocks of page P3 having aged. In the example, caches C1, C2 and C3 all receive a message to invalidate data relating to page P3. This is shown in cache coherence table 200d where data relating to page P3 has been replaced by an entry for block P1.3.

Among other possible benefits, a system in accordance with the disclosure may determine the likelihood of whether a block is still stored in a cache. In response to a determination that a particular block has aged, a directory controller may send a request for the block off of the die and avoid increasing latency by first sending a request to the cache that was indicated as last storing the block. In response to a determination that a particular block has not aged at a particular cache, a directory controller may send a request for the block to the particular cache, avoiding increasing both latency and bandwidth usage by not sending a request to the memory controller. A system in accordance with the disclosure may account for some caches being relatively idle where little to no blocks are evicted or where threads are being run that are not data intensive. In these examples, blocks may not age quickly. In other examples, where data intensive threads are being processed, blocks may be evicted at a faster rate and that data may be accounted for using the block miss data. Directory performance and energy efficiency may be improved as the directory controller is provided with instructions on whether to send a request to a cache indicated in a directory or to a memory controller off a chip. As stale data entries may be identified, those entries may be removed from the directory freeing up space resulting in less directory overhead. Logic regarding directory eviction may be improved as eviction may be based on staleness of an entry.

Figure 3:
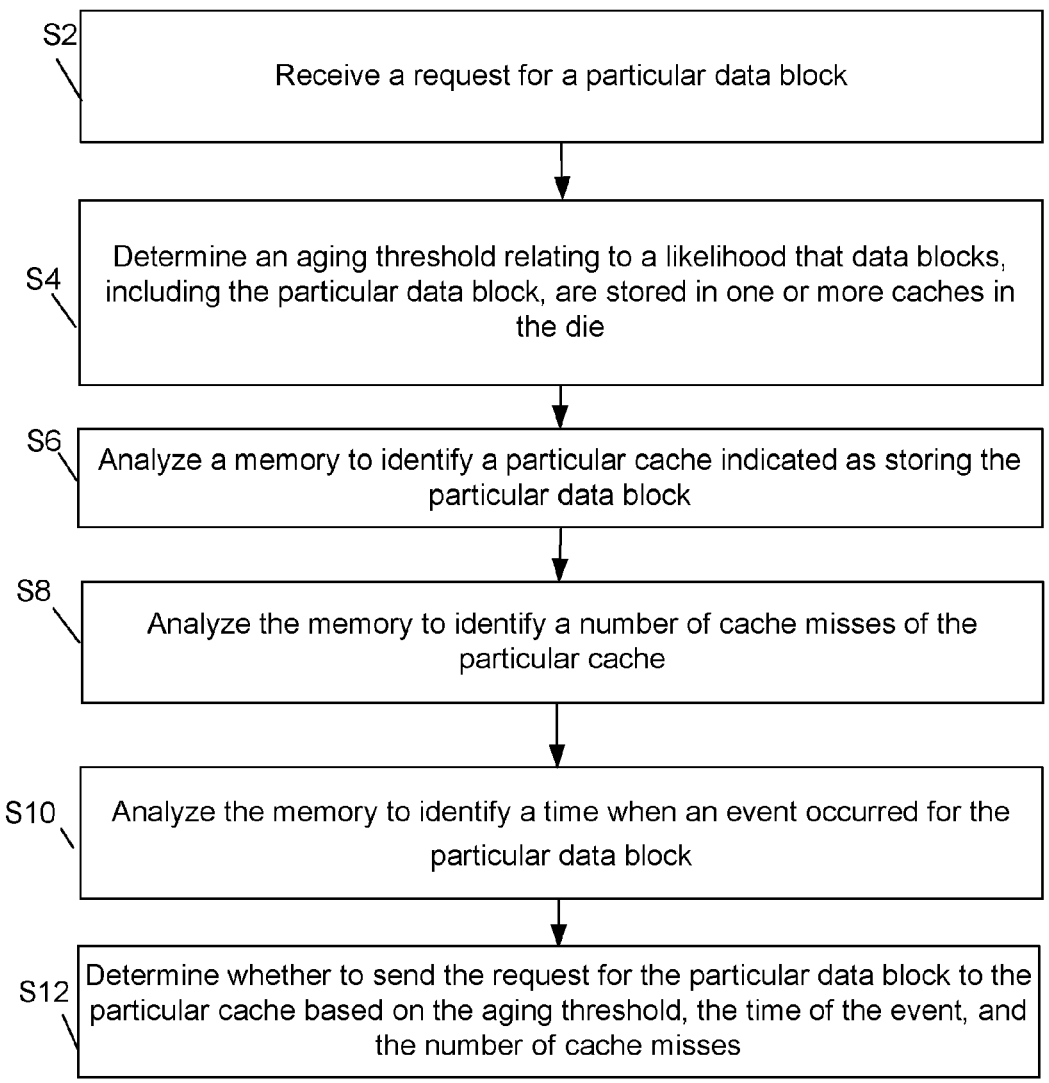
FIG. 3 depicts a flow diagram for an example process for implementing a cache coherence directory in a multi-processor architecture.

FIG. 3 depicts a flow diagram for an example process for implementing a cache coherence directory in a multi-processor architecture arranged in accordance with at least some embodiments described herein. In some examples, the process in FIG. 3 could be implemented using system 100 discussed above and may be used for processing a request in a die in a multi-processor architecture.

An example process may include one or more operations, actions, or functions as illustrated by one or more of blocks S2, S4, S6, S8, S10, and/or S12. Although illustrated as discrete blocks, various blocks may be divided into additional blocks, combined into fewer blocks, or eliminated, depending on the desired implementation.

Processing may begin at block S2, "Receive a request for a particular data block." At block S2, a directory controller may receive a request for a particular data block. The request may be, for example, a request to read from or write to the data block.

Processing may continue from block S2 to block S4, "Determine an aging threshold relating to a likelihood that data blocks, including the particular data block, are stored in one or more caches in the die." At block S4, the directory may determine an aging threshold relating to a likelihood that data blocks are stored in one or more caches in the die. For example, the directory may determine averages and standard deviations relating to numbers of misses that have occurred in the past to blocks in the die.

Processing may continue from block S4 to block S6, "Analyze a memory to identify a particular cache indicated as storing the particular data block." At block S6, the directory may analyze a memory to determine a particular cache indicated as storing the particular data block.

Processing may continue from block S6 to block S8, "Analyze the memory to identify a number of cache misses of the particular cache." At block S8, the directory may analyze the memory to determine a number of cache misses for the particular cache.

Processing may continue from block S8 to block S10, "Analyze the memory to identify a time when an event occurred for the particular data block." At block S10, the directory may analyze the memory to identify a time when an event occurred for the particular data block or a page including the data block. An event may include, for example, a cache miss or request to upgrade a coherence state. The time of the event may identify the last time a block was known by the directory to have been accessed.

Processing may continue from block S10 to block S12, "Determine whether to send the request for the particular data block to the particular cache based on the aging threshold, the time of the event, and the number of cache misses." At block S12, the directory may determine whether to send the request for the particular data block to the particular cache or to a memory controller based on the aging threshold, the time of the event or the number of cache misses. For example, if the time of the event is less than the number of cache misses minus the aging threshold, the directory may determine that the block has not aged and may send the request to the particular cache. Conversely, if the time of the event is greater than the number of cache misses minus the aging threshold, the directory may determine that the block has aged and may send the request to the memory controller.

FIG. 4 illustrates an example computer program product 300 that can be utilized to implement a cache coherence directory in a multi-processor architecture arranged in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-3. Thus, for example, referring to system 100, directory controller 120 may undertake one or more of the blocks shown in FIG. 4 in response to instructions 304 conveyed to the system 100 by medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

Figure 5:
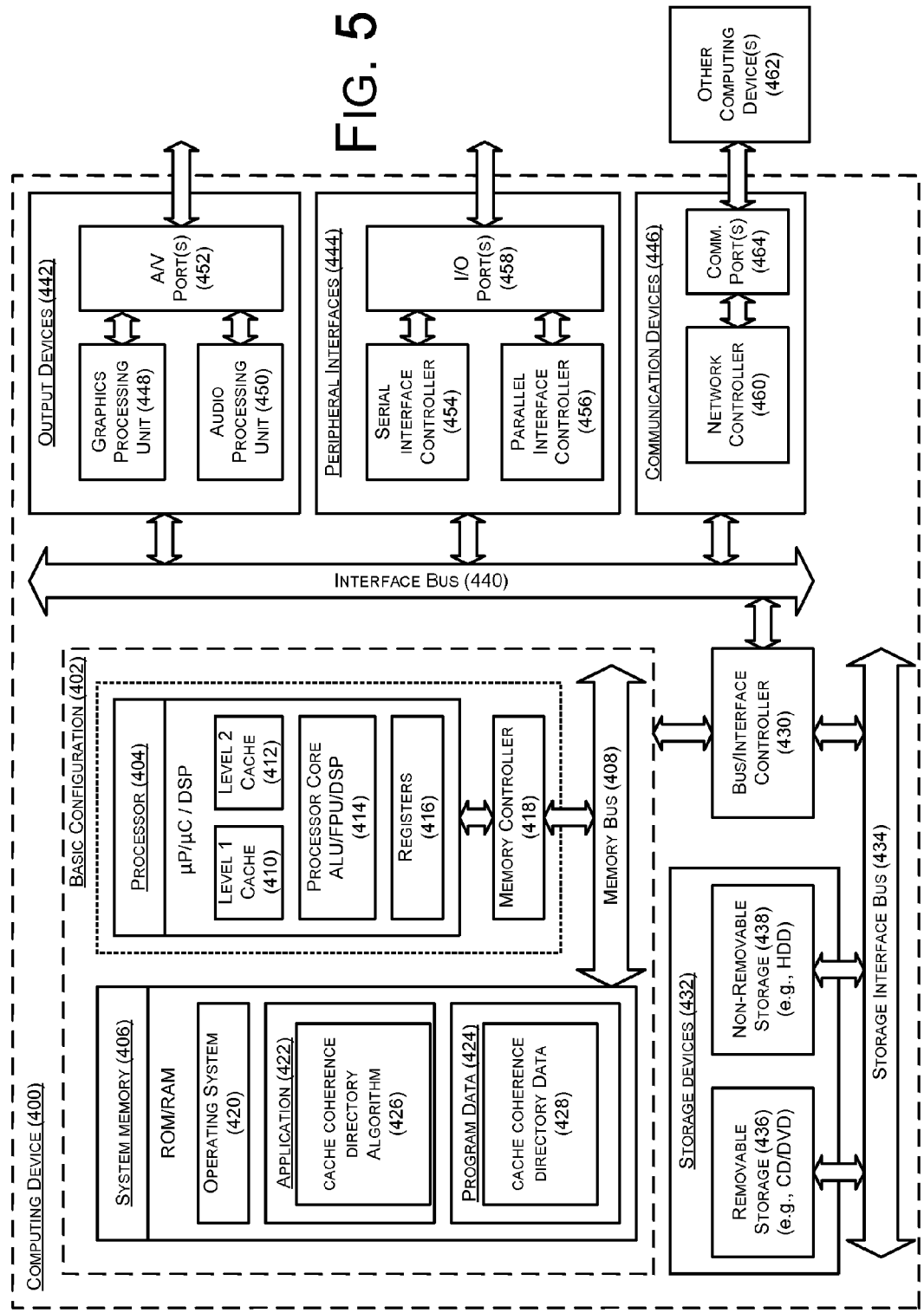
FIG. 5 is a block diagram illustrating an example computing device that is arranged to implement a cache coherence directory in a multi-processor architecture.

FIG. 5 is a block diagram illustrating an example computing device 400 that is arranged to implement a cache coherence directory in a multi-processor architecture arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a cache coherence directory algorithm 426 that is arranged to perform the functions as described herein including those described with respect to system 100 of FIGS. 1 and 2. Program data 424 may include cache coherence directory data 428 that may be useful to implement a cache coherence directory in a multi-processor architecture as is described herein. In some embodiments, application 422 may be arranged to operate with program data 424 on operating system 420 such that a cache coherence directory in a multi-processor architecture may be provided. This described basic configuration 402 is illustrated in FIG. 5 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to manage directory information in a die in a multi-processor architecture, the method comprising:
   receiving a request, by a directory, for a particular data block, wherein the request is associated with a cache in the die;
   updating, by the directory in response to the received request, a first entry in a memory, wherein the first entry is associated with the particular data block, and wherein the first entry corresponds to a number of cache misses experienced by the cache;
   updating, by the directory, the number of cache misses for the particular data block to produce an updated number of cache misses for the cache; and updating, by the directory, a second entry in the memory, wherein the second entry corresponds to the updated number of cache misses for the cache.

2. The method of claim 1, wherein the request is generated in response to a change in a coherence state of the particular data block.

3. The method of claim 1, wherein the first entry relates to a last time when an event occurred for the particular data block.

4. The method of claim 3, wherein the last time of the event is based on an event on a page that includes the particular data block.

5. A method to process a request in a die in a multi-processor architecture, the method comprising:
receiving a request, by a directory, for a particular data block;
analyzing, by the directory, a memory to identify a particular cache indicated as storing the particular data block;
analyzing, by the directory, the memory to identify a number of cache misses for the particular cache;
analyzing, by the directory, the memory to identify a last time when an event occurred for the particular data block or for a page that includes the particular block; and
determining, by the directory, whether to send the request for the particular data block to the particular cache based on the time of the event and the number of cache misses.

6. The method of claim 5, wherein the number of cache misses is a first number of cache misses, the method further comprising:
analyzing, by the directory, the memory to identify a second number of cache misses for the particular cache.

7. The method of claim 6, wherein determining whether to send the request for the particular data block to the particular cache is further based on the second number of cache misses.

8. The method of claim 5, further comprising determining, by the directory, an aging threshold relating to a likelihood that the particular data block is stored in at least one cache in the die, wherein determining whether to send the request for the particular data block is further based on the aging threshold.

9. The method of claim 5, wherein the time of the event is based on an event in the particular cache.

10. The method of claim 5, wherein the time of the event is based on an event on a page including the particular data block in the particular cache, or based on an event in another cache in the die.

11. The method of claim 5, wherein the event is a cache hit or a request to upgrade a coherence state.

12. The method of claim 5, further comprising evicting, by the directory, an entry in the memory based on the time of the event and the number of cache misses.

13. The method of claim 5, further comprising evicting, by the directory, an entry in the memory based on the time of the event and the number of cache misses; and
sending a message, by the directory, to invalidate the particular data block from the particular cache.

14. The method of claim 5, further comprising evicting, by the directory, an entry in the memory based on the time of the event, and the number of cache misses; and
sending, by the directory, a message to invalidate a page including the particular data block from the particular cache.

15. The method of claim 5, further comprising sending, by the directory, the request to a memory controller based on the time of the event and the number of cache misses.

16. The method of claim 5, wherein the time of the last event is based on the number of cache misses.

17. A die in a multi-processor architecture, the die comprising:
a first tile including a first cache and a first processor;
a second tile including a second cache and a second processor;
a directory configured to be in communication with the first tile and the second tile, the directory including a memory and a directory controller, the directory controller effective to:
analyze the memory to identify a particular cache from among the first cache and the second cache indicated as storing a particular data block;
at least one of: analyze the memory to identify a last time when an event occurred for the particular data block or for a page that includes the particular data block, analyze the memory to identify a number of cache misses when the event last occurred for the particular block or for the page that includes the particular block, or analyze the memory to identify an approximate number of cache misses when the event last occurred for the particular block or for the page that includes the particular block; and
determine whether to send the request for the particular data block to the particular cache based on at least one of: the time of the event, the number of cache misses, or the approximate number of cache misses.

18. The die of claim 17, wherein the directory controller is further effective to:
determine an aging threshold relating to a likelihood that the particular data block is stored in one or more caches in the die; and
wherein the determination of whether to send the request for the particular data block to the particular cache is further based on the aging threshold.

19. The die of claim 17, wherein the event is a cache hit or a request to upgrade a coherence state.

20. A method to process a request in a die in a multi-processor architecture, the method comprising:
receiving a request, by a directory, for a particular data block;
determining, by the directory, an aging threshold relating to a likelihood that data blocks, including the particular data block, are stored in one or more caches in the die;
analyzing, by the directory, a memory to identify a particular cache indicated as storing the particular data block;
analyzing, by the directory, the memory to identify a first number of cache misses for the particular cache;
analyzing, by the directory, the memory to identify a second number of cache misses, wherein the second number of cache misses is related to a number of cache misses since an event last occurred for a page that includes the particular data block; and
determining, by the directory, whether to send the request for the particular data block to the particular cache based on the aging threshold, the time of the event, and the number of cache misses.

21. The method of claim 20, wherein determining, by the directory, whether to send the request for the particular data block to the particular cache further comprises:
determining whether a difference between the first number of cache misses and the second number of cache misses exceeds the aging threshold.

22. The method of claim 20, further comprising:
evicting, by the directory, an entry in the memory based on the aging threshold, the first number of cache misses, and the second number of cache misses; and sending a message, by the directory, to invalidate the particular data block from the particular cache.

23. The method of claim 20, further comprising:
evicting, by the directory, an entry in the memory based on the aging threshold, the first number of cache misses, and the second number of cache misses; and
sending, by the directory, a message to invalidate the page that includes the particular data block from the particular cache.

\* \* \* \* \*